United States Patent
Dalton et al.

(10) Patent No.: US 6,442,925 B1
(45) Date of Patent: Sep. 3, 2002

(54) MANIFOLD DRAIN SYSTEM FOR GAS TURBINE

(75) Inventors: William H. Dalton, Amston; George L. Bennett, Hebron; Raymond Zagranski, Somers, all of CT (US)

(73) Assignee: Coltec Industries Inc, Charlotte, NC (US)

( * ) Notice: Subject to any disclaimer, the term of this patent is extended or adjusted under 35 U.S.C. 154(b) by 35 days.

(21) Appl. No.: 09/653,143

(22) Filed: Aug. 31, 2000

Related U.S. Application Data

(60) Provisional application No. 60/151,545, filed on Aug. 31, 1999.

(51) Int. Cl.[7] .............................................. F02C 7/232
(52) U.S. Cl. ...................................... 60/39.094; 60/734
(58) Field of Search ....................... 60/39.091, 39.094, 60/39.141, 734

(56) References Cited

U.S. PATENT DOCUMENTS

| | | |
|---|---|---|
| 3,387,644 A | 6/1968 | Heinecke et al. |
| 3,774,394 A | 11/1973 | Criffield |
| 3,841,089 A | 10/1974 | Clark |
| 3,901,025 A | 8/1975 | Bryerton et al. |
| 4,016,716 A | 4/1977 | Evans et al. |
| 4,149,372 A | 4/1979 | Gavin et al. |
| 4,206,595 A | 6/1980 | Cole |
| 4,539,809 A | 9/1985 | Stanley et al. |
| 5,095,694 A | 3/1992 | Shekleton et al. |
| 5,159,808 A | 11/1992 | Kast |
| 5,368,273 A | 11/1994 | Dante |
| 5,448,882 A | 9/1995 | Dyer et al. |
| 5,845,484 A | 12/1998 | Maker |

FOREIGN PATENT DOCUMENTS

| | | |
|---|---|---|
| GB | 1 410 973 | 10/1975 |
| GB | 2 227 795 A | 8/1990 |

OTHER PUBLICATIONS

International Search Report dated Dec. 29, 2000.

*Primary Examiner*—Louis J. Casaregola
(74) *Attorney, Agent, or Firm*—Cummings & Lockwood

(57) ABSTRACT

A system is disclosed for draining residual fuel from the engine manifold of a gas turbine which includes an ejector having an inlet port for receiving high pressure fuel from a main fuel pump at engine shut-down, an outlet port and a suction port. The ejector defines a nozzle that extends between the inlet port and the outlet port for increasing the velocity of high pressure fuel flowing therethrough at engine shut-down so as to create suction at the suction port. A motive valve controls the flow of high pressure fuel between the main fuel pump and the inlet port of the ejector. The motive valve is configured for movement between a first position wherein high pressure fuel is directed from the main fuel pump to the engine manifold during engine start-up and operation, and a second position wherein high pressure fuel is directed from the main fuel pump to the inlet port of the ejector at engine shut-down. A drain valve controls the flow of residual fuel between the engine manifold and the suction port of the ejector. The drain valve is configured for movement between a closed position and an open position as the motive valve moves between the first position and the second position, such that residual fuel is drawn from the engine manifold under suction to the inlet port of the ejector. A fuel recycle conduit is provided for delivering the residual fuel from the outlet port of the ejector to the fuel tank.

11 Claims, 4 Drawing Sheets

MANIFOLD DRAIN SYSTEM FOR GAS TURBINE

CROSS-REFERENCE TO RELATED APPLICATION

The subject application claims priority to U.S. Provisional Patent Application Ser. No. 60/151,545 which was filed on Aug. 31, 1999, the disclosure of which is herein incorporated by reference in its entirety.

BACKGROUND OF THE INVENTION

1. Field of the Invention

The subject invention relates to gas turbine engines, and more particularly, to a system for transferring residual fuel from the engine manifold of a gas turbine engine to prevent fuel from coking in the engine manifold when the engine is shut down.

2. Background of the Related Art

In aircraft gas turbine engines, it is desirable to prevent residual fuel from remaining in the engine manifold valve after the engine has shutdown so as to prevent coking of the residual fuel. Coking of the residual fuel presents a fire hazard and can cause blockages in the engine fuel injectors which can shorten injector life and harm engine performance.

It is known in the art to store residual fuel in a drain can or container, with the container being connected to the engine manifold through a valve which opens when the engine is shut down. With the valve open, the system is arranged to drain the residual fuel into the container using gravity and/or the pressure differential between the engine manifold and the container. Since the amount of residual fuel drained into the container at each engine shutdown may be as much as one gallon or more, it is generally necessary, due to the size limitations of the container, to empty the container between engine shutdowns.

While numerous methods or systems for emptying such containers between engine shutdowns have been employed, they generally suffer from the disadvantage of either emptying the contents of the container into the atmosphere upon takeoff or requiring the aircraft ground crew to manually empty the container. For example, one prior art method involves directing ram pressure to the container to force the collected fuel to drain to the atmosphere upon aircraft takeoff. With increased air traffic, high population density in the vicinity of most airports, and greater environmental awareness, such atmospheric dumping systems have become unacceptable.

U.S. Pat. No. 3,774,394 to Criffield discloses another system for draining residual fuel from the manifold of an aircraft engine, downstream of the engine shutoff valve, to prevent the fuel from coking. The system includes an eductor pump and valve assembly, with the valve assembly being operative to direct pressurized fuel to the eductor pump as motive fluid therefor during engine spin-down. A drain valve is provided which opens through the actuation of mechanical or electrical means when the engine shutoff valve is closed, so as to drain the fuel downstream of the shutoff valve into a drain can. The eductor pump is connected to the drain can and the output of the high pressure engine fuel pump through the valve assembly is used to pump residual fuel from the drain can to the fuel supply system of the aircraft. The valve assembly is a relatively complex mechanism that includes a reciprocating piston carrying a spring loaded plunger that acts as a check valve to prevent the reverse flow of fuel from the eductor to the drain can as the engine coasts down and the eductor pump action is lost.

While the Criffield patent provides a unique system for pumping the residual fuel from an engine manifold after the engine is shut down, it is a relatively complex system. In particular, the system requires a check valve to prevent fuel from flowing back into the drain can when the pumping action of the eductor becomes insufficient to maintain the piston in its open position. It also requires the sequential actuation of the engine shutoff valve and the drain valve. These features add to the overall complexity and may decrease the reliability of the system. Accordingly, there is a need for an improved engine manifold drain system which overcomes the deficiencies of prior art systems.

SUMMARY OF THE INVENTION

The subject invention is directed to a system for draining residual fuel from the engine manifold of an aircraft gas turbine engine to prevent the fuel from coking. In accordance with a preferred embodiment of the subject invention, the gas turbine is operatively associated with a fuel metering unit having a main fuel pump, for example, a variable displacement vane pump, for delivering high pressure fuel to the engine manifold, a boost pump for delivering low pressure fuel from a fuel tank to the main fuel pump, and a shutoff valve for controlling the flow of high pressure fuel between the engine manifold and the main fuel pump.

The manifold drain system includes an ejector having an inlet port for receiving high pressure fuel from the main fuel pump at engine shut-down, an outlet port and a suction port. The ejector defines a nozzle that extends between the inlet port and the outlet port for increasing the velocity of high pressure fuel flowing therethrough at engine shut-down so as to create suction at the suction port.

The manifold drain system further includes a motive valve and a drain valve. The motive valve controls the flow of high pressure fuel between the main fuel pump and the inlet port of the ejector. It is configured for movement between a first position wherein high pressure fuel is directed from the main fuel pump to the engine manifold during engine start-up and operation, and a second position wherein high pressure fuel is directed from the main fuel pump to the inlet port of the ejector at engine shut-down. The drain valve controls the flow of residual fuel between the engine manifold and the suction port of the ejector. It is configured for movement between a closed position and an open position as the motive valve moves between the first position and the second position. As a result, residual fuel is drawn from the engine manifold under suction to the inlet port of the ejector. In addition, a fuel recycle conduit is provided for delivering the residual fuel from the outlet port of the ejector to the fuel tank.

Preferably, the manifold drain system of the subject invention further includes means for controlling the simultaneous operation of the motive valve and the drain valve. The controlling means includes a three-way solenoid valve that is in fluid communication with the low pressure side of the main fuel pump by a flow restricted fuel control line and is in fluid communication with the high pressure side of the main fuel pump by a siphon line.

In addition, the manifold drain system includes means for facilitating fluid communication between the solenoid valve and the motive valve, drain valve and shutoff valve, such that upon engine shut-down the siphon line is opened to direct high pressure fuel from the main fuel pump to the shutoff valve, motive valve and drain valve, whereby the engine shutoff valve is moved to a closed position, the motive valve is moved to the second position, and the drain valve is moved the open position. Conversely, upon engine start-up the siphon line is closed so that low pressure fuel is directed from the boost pump to the shutoff valve, motive valve and drain valve, whereby the engine shutoff valve is moved to an open position, the motive valve is moved to the first position, and the drain valve is moved to the closed position. Means are also provided for activating the solenoid valve upon engine shut-down so as to open the siphon line.

In accordance with a preferred embodiment of the subject invention, the motive valve and the drain valve define an integral valve assembly having a common valve housing and a common valving member. In certain instances, the integral valve assembly may include a float valve for preventing air and combustion gases from entering the fuel system once the residual fuel has been drained therefrom. However, this mechanism is not required for the efficient operation of the system.

These and other unique features of the manifold drainage system of the subject invention will become more readily apparent from the following description of the drawings taken in conjunction with the detailed description of the preferred embodiments.

BRIEF DESCRIPTION OF THE DRAWINGS

So that those having ordinary skill in the art to which the subject invention appertains will more readily understand how to construct and use the same, reference may be had to the drawings wherein.

These and other features of the manifold drain system of the subject invention will become more readily apparent to those having ordinary skill in the art from the following detailed description of the preferred embodiments taken in conjunction with the drawings.

DETAILED DESCRIPTION OF THE PREFERRED EMBODIMENTS

Figure 1:
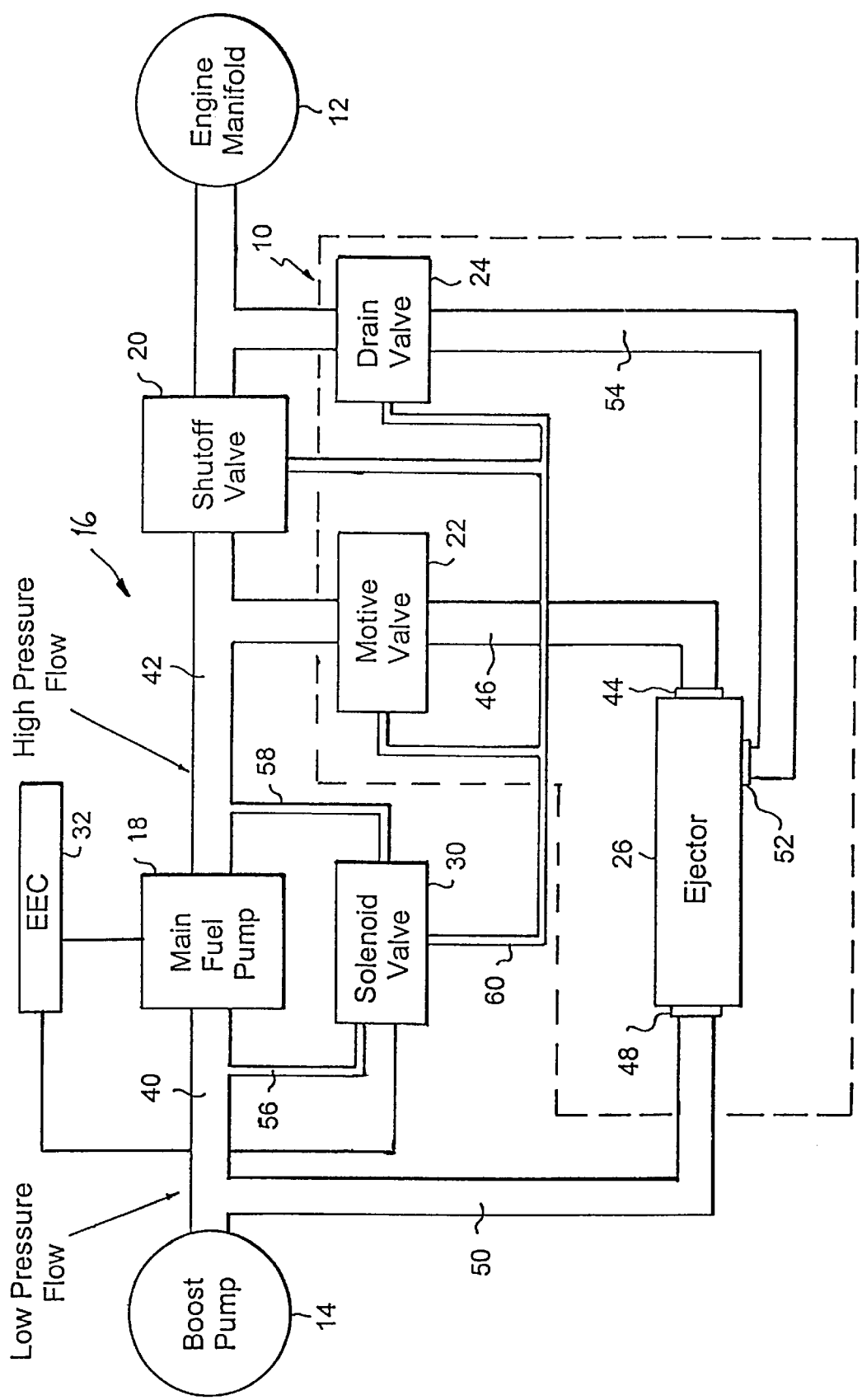
FIG. 1 is a schematic representation of a manifold drain system configured in accordance with a preferred embodiment of the subject invention in conjunction with a fuel metering unit that includes a boost pump, main fuel pump and engine shutoff valve.

Referring now to the drawings wherein like reference numerals identify similar aspects of the subject invention, there is illustrated in FIG. 1 a schematic representation of the engine manifold drain system of the subject invention which is designated generally by reference numeral 10. Throughout the drawings, directional arrows are used to indicate the direction of fluid flow through the various conduits and between the various components of the manifold drain system 10 of the subject invention. Manifold drain system 10 is a light weight, low cost, highly efficient system that is intended for use in conjunction with an aircraft gas turbine engine for transferring residual fuel from the engine manifold to the aircraft fuel tank to prevent the fuel from coking in the manifold after the engine has been shut down. Those skilled in the art will readily appreciate however, that the drainage system of the subject invention may also be employed with other types of gas turbine engines, such as, for example, marine gas turbine engines.

Referring now to FIG. 1, the manifold drain system 10 of the subject invention is operatively associated with the engine manifold 12 of a gas turbine engine (not shown) and a fuel metering/control unit 16 that is adapted to deliver metered quantities of fuel to the injectors and spray nozzles associated with the engine manifold. The fuel metering unit 16 is operatively associated with a boost pump 14 and includes a main fuel pump 18 and an engine shutoff valve 20. The main fuel pump and engine shutoff valve are preferably provided as an integral unit, that may also include other components of the subject invention, as will be described below. The boost pump 14, which may also be integrated into the fuel metering unit is designed to deliver fuel from the aircraft fuel tank (not shown) to the main fuel pump 18 through a low pressure fuel conduit 40 at engine start-up and during engine operation. The engine shutoff valve 20 is disposed downstream from the main fuel pump 18 and controls the flow of high pressure fuel between the main fuel pump 18 and the engine manifold 12 through a high pressure fuel conduit 42. It is envisioned that the main fuel pump 18 may be in the form of a fixed displacement vane pump or a similar type of fuel pump known in the art.

The manifold drain system 10 of the subject invention includes three primary components which work in concert to drain the residual fuel from the engine manifold 12 when the engine is shut down to prevent the fuel from coking. These components include a motive valve 22, a drain valve 24, and an ejector pump 26. As discussed in further detail hereinbelow, the motive valve 22 is configured to direct high pressure fuel from the main fuel pump 18 to the ejector pump 26 as a motive fluid to generate suction which draws residual fuel from the engine manifold 12 into the ejector pump 26 through the drain valve 24 at engine shutdown. In accordance with a preferred embodiment of the subject invention, the motive valve and drain valve form an integral valve assembly that includes a common valve housing and a common valve member.

With continuing reference to FIG. 1, ejector pump 26 has a fuel inlet 44 for receiving high pressure fuel from motive valve 22 through a motive flow conduit 46, and a fuel outlet 48 for delivering fuel to the low pressure fuel conduit 40 associated with boost pump 14 through a fuel recycle conduit 50. In addition, ejector pump 26 has a suction port 52 which is in fluid communication with drain valve 24 through fuel drain conduit 54.

As explained in greater detail below, during engine operation, the engine shutoff valve 20 is disposed in an open position so that relatively high pressure fuel from the main fuel pump 18 flows to the engine manifold 12, while the motive valve 22 and drain valve 24 are closed. Thus, during engine operation the fuel flow to the engine manifold is not interrupted or diminished. Upon engine shut-down, the shutoff valve 20 is closed so as to prevent fuel from flowing to the engine manifold 12. At the same time, the motive valve 22 and the drain valve 24 are opened. As a result, high pressure fuel is directed by the motive valve 22 to the inlet 44 of the ejector 26 as motive, and consequently residual fuel is drawn from the engine manifold 12 to the suction port 52 of the ejector 26 through the drain valve 24.

Figure 2:
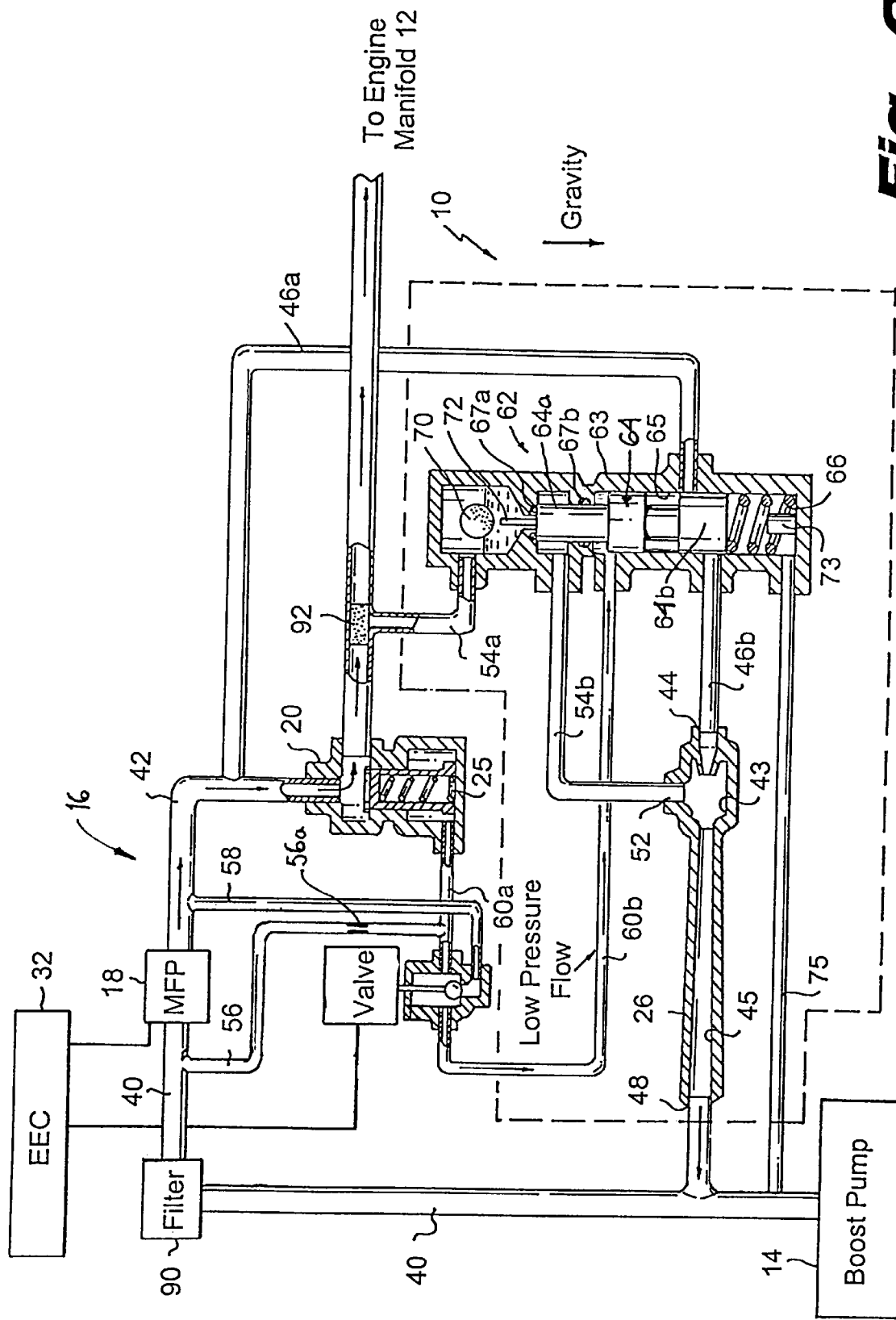
FIG. 2 is an illustration of the manifold drain system of FIG. 1 during engine start-up and operation wherein the siphon line is closed by the solenoid valve to direct low pressure fuel from the boost pump to the shutoff valve, motive valve and drain valve, and wherein a float valve is provided for preventing air and combustion gases from entering the fuel system once the residual fuel has been drained therefrom.

Referring to FIG. 2, the interior of ejector pump 26 defines a fuel intake chamber 43 and an elongated radially outwardly expanding nozzle passage 45 that extends from the fuel intake chamber 43 to the fuel outlet 48 of the ejector pump 26. Nozzle passage 45 is dimensioned and configured to increase the velocity of the high pressure fuel entering the intake chamber 43. The increased velocity of the high pressure fuel passing through ejector pump 26 creates momentum and kinetic energy in the fluid which, in turn, generates suction forces within the intake chamber 43. This causes a pumping action within the intake chamber 43 which draws residual fuel into the suction port 52 of the ejector 26 from the engine manifold 12. This residual fuel is then expelled from the fuel outlet 48 to the low pressure conduit 40 by way of the fuel recycle conduit 50, along with the high pressure fuel flowing through the ejector 26.

Referring again to FIG. 1, the manifold drain system 10 of the subject invention also includes a three-way solenoid valve 30 for controlling the operation of the engine shutoff valve 20, the motive valve 22, and the drain valve 24. The solenoid valve 30 operates in response to control signals received from an electronic engine controller 32 associated with the fuel metering unit 16. Preferably, solenoid valve 30 is an integral part of the fuel metering unit which includes the main fuel pump 18 and shutoff valve 20. As illustrated schematically in FIG. 1, solenoid valve 30 is in fluid communication with the low pressure fuel conduit 40 by a fuel line 56, and it is in fluid communication with the high pressure fuel conduit 42 by a siphon line 58. Solenoid valve 30 is also in direct fluid communication with the engine shutoff valve 20, the motive valve 22 and the drain valve 24 by a fuel line designated generally by reference numeral 60. As illustrated in FIG. 2, fuel line 56, which includes an in-line flow restrictor 56a, communicates with a low pressure inlet port of the three-way solenoid valve 30 through fuel line 60a. The flow restrictor 56a is configured to permit low pressure flow through fuel line 56 when solenoid valve 30 is closed during engine shut-down, and it restricts high pressure flow through fuel line 56 when solenoid 30 is open during engine operation.

In use, at engine start-up and during engine operation, solenoid valve 30 is disposed in a first position, wherein the siphon line 58 is closed. Thus, relatively low pressure fuel is directed from the boost pump 14 to the engine shutoff valve 20, the motive valve 22 and the drain valve 24 by way of fuel line 56. As a result, the engine shutoff valve 20 is opened, while the motive valve 22 and drain valve 24 are simultaneously closed. (See FIG. 2).

Conversely, when the engine is shut-down, the solenoid valve 30 is moved to a second position wherein the siphon line 58 is open. (See FIG. 3). Thus, relatively high pressure fuel is directed from the main fuel pump 18 to the shutoff valve 20, the motive valve 22 and the drain valve 24. As a result, the engine shutoff valve 20 is closed under the force of coiled control spring 25, while the motive valve 22 and drain valve 24 are simultaneously opened. The electronic engine controller 32 is programmed to activate (or deactivate) the solenoid valve 30 upon engine shut-down to open the siphon line 58, thereby facilitating the simultaneous operation of valves 20, 22 and 24.

Referring now to FIG. 2, the manifold drain system of FIG. 1 is shown during engine operation, with the solenoid valve 30 in a closed position, directing relatively low pressure fuel to the engine shutoff valve 20 through control line 60a, and to the motive valve 22 and the drain valve 24 through control line 60b. As a result, the shutoff valve 20 is opened, and the motive and drain valves are closed. At such a time, low pressure fuel is fed to solenoid valve 30 through restricted fuel line 56.

As shown in FIG. 2, the drain valve 24 and the motive valve 22 define portions of a compact integral valve assembly 62. Valve assembly 62 includes an elongated valve body 63 with an interior valve chamber 65 supporting a valve member 64. Valve member 64 is biased into a normally closed position within valve chamber 65 by a coiled compression spring 66. Valve member 64 is common to the motive valve 22 and the drain valve 24 but defines distinct valve portions. These valve portions include an upper valve portion 64a which serves as the flow control member for the drain valve 24 and a lower valve portion 64b which serves as the flow control member for the motive valve 22. Those skilled in the art will readily appreciate that various sealing means and fittings such as upper and lower seals 67a and 67b may be provided within valve chamber 65 to sealing isolate the distinct valve portions of valve assembly 62.

As illustrated in FIG. 2, control line 60b communicates with the interior chamber 65 of valve assembly 62 adjacent to the upper valve portion 64a. Motive flow is delivered to the interior valve chamber 65 adjacent to the lower valve portion 64b through motive flow conduit 46a, and motive flow exits the valve chamber from motive flow conduit 46b, which, in turn, communicates with the motive flow inlet 44 of ejector pump 26. Residual fuel flow enters valve chamber 65 by way of drainage flow conduit 54a and exits valve chamber 65 through drainage flow conduit 54b, which, in turn, communicates with the suction port 52 of ejector pump 26. In addition, a supplemental drainage conduit 75 extends between the valve assembly 62 and the low pressure fuel conduit 40 for draining excess hold-up volume that may accumulate in the lower extremities of valve chamber 65 after valve member 64 has closed.

Figure 3:
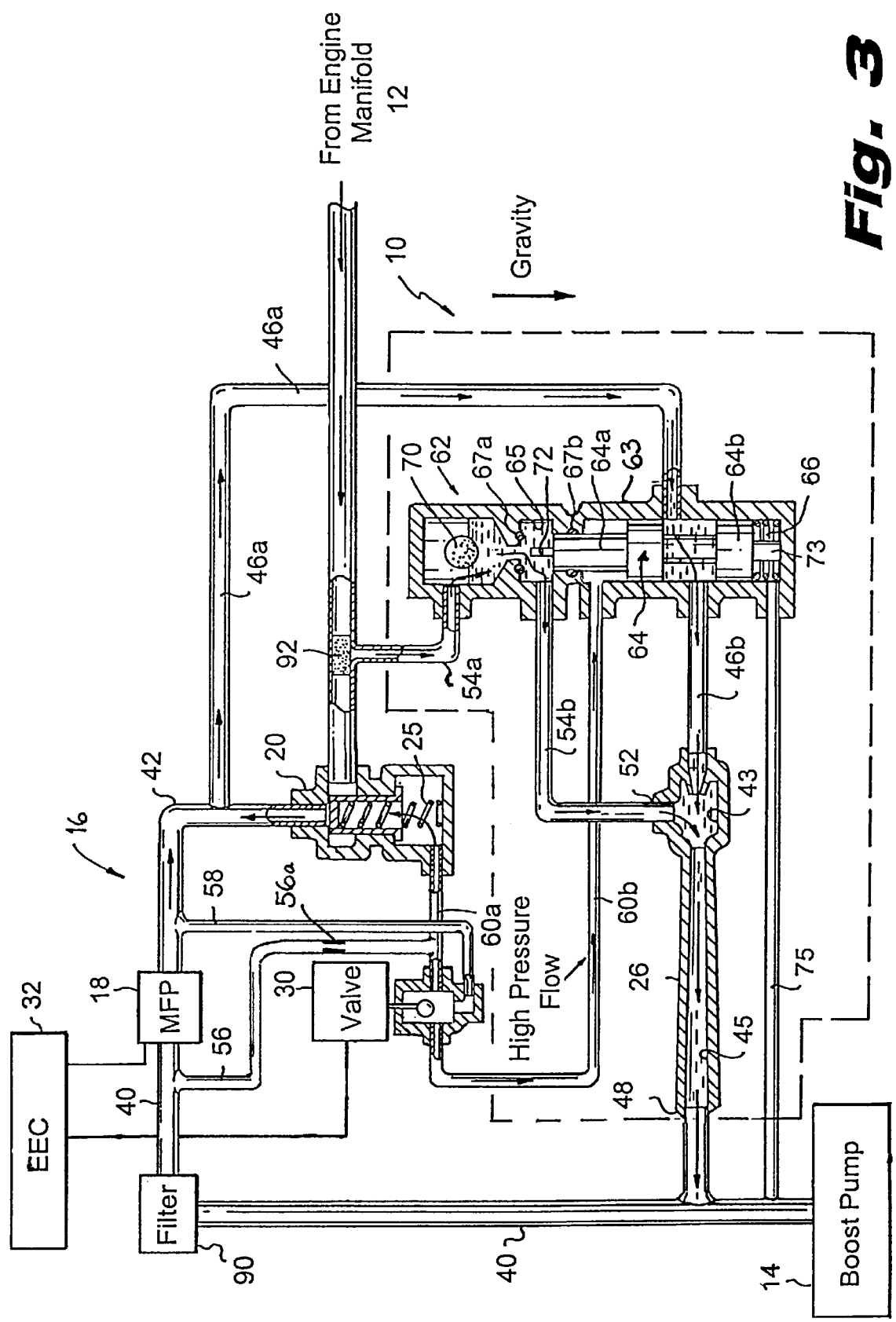
FIG. 3 is an illustration of the manifold drain system of FIG. 1 during engine shut-down wherein the siphon line is opened by the solenoid valve to direct high pressure fuel from the main fuel pump to the shutoff valve, motive valve and drain valve.

FIG. 3 shows the manifold drain system 10 of the subject invention when the engine is shutdown. At such a time, the solenoid valve 30 is open and directs relatively high pressure fuel to the shutoff valve 20 through control line 60a, and to the motive valve 22 and the drain valve 24 through control line 60b. As a result, the shutoff valve 20 is closed by the force of coiled spring 68, and the motive and drain valves are opened against the bias of valve spring 66. Thereupon, manifold scavenging begins via drainage conduit 54a through the pumping action of the ejector 26 driven by the motive flow from the main fuel pump 18. At this time, the flow restrictor 56a in fuel line 56 prevents the back flow of high pressure fuel therethrough.

By way of example, it has been estimated that 0.10 ft$^3$ of residual fuel can be scavenged from the engine manifold in less than 3 seconds, assuming that the engine starts at 60% speed and spools down to 40% speed in 3 seconds. This also assumes that the aircraft boost pumps are on and providing 50 psig to the inlet of the main fuel pump. Those skilled in the art will readily appreciate that a lower inlet pressure will substantially reduce the scavenge time.

With continuing reference to FIG. 3, the integral valve assembly 62 also includes a buoyant float valve 70 disposed in the upper portion of interior valve chamber 65. Float valve 70 is adapted and configured to prevent air and combustion gases from entering the fuel system once the residual fuel has been drained completely therefrom. When the turbine engine has wound down and the motive flow from the high pressure fuel has been exhausted, the spring 66 in the valve assembly 62 takes over to force valve member 64 to simultaneously close the motive valve and drains valve. Valve member 64 includes an upstanding prong 72 for ensuring that the float valve 70 is in an open position for the next engine start-up, operation and shut-down cycle. Similarly, an upstanding prong 73 is provided at the lower end of valve chamber 65 to stage valve member 64 in an appropriate position for service. The float valve is an optional feature of the integral valve assembly 62 and may be excluded therefrom, as it is not required for the efficient operation of the drain system 10.

With continuing reference to FIGS. 2 and 3, a primary fuel filter 90 is operatively associated with the low pressure conduit 40 upstream from the boost pump 40, and a secondary fuel filer 92 is disposed within the high pressure fuel conduit 42 at the junction with the drainage flow conduit 54a.

Figure 4:
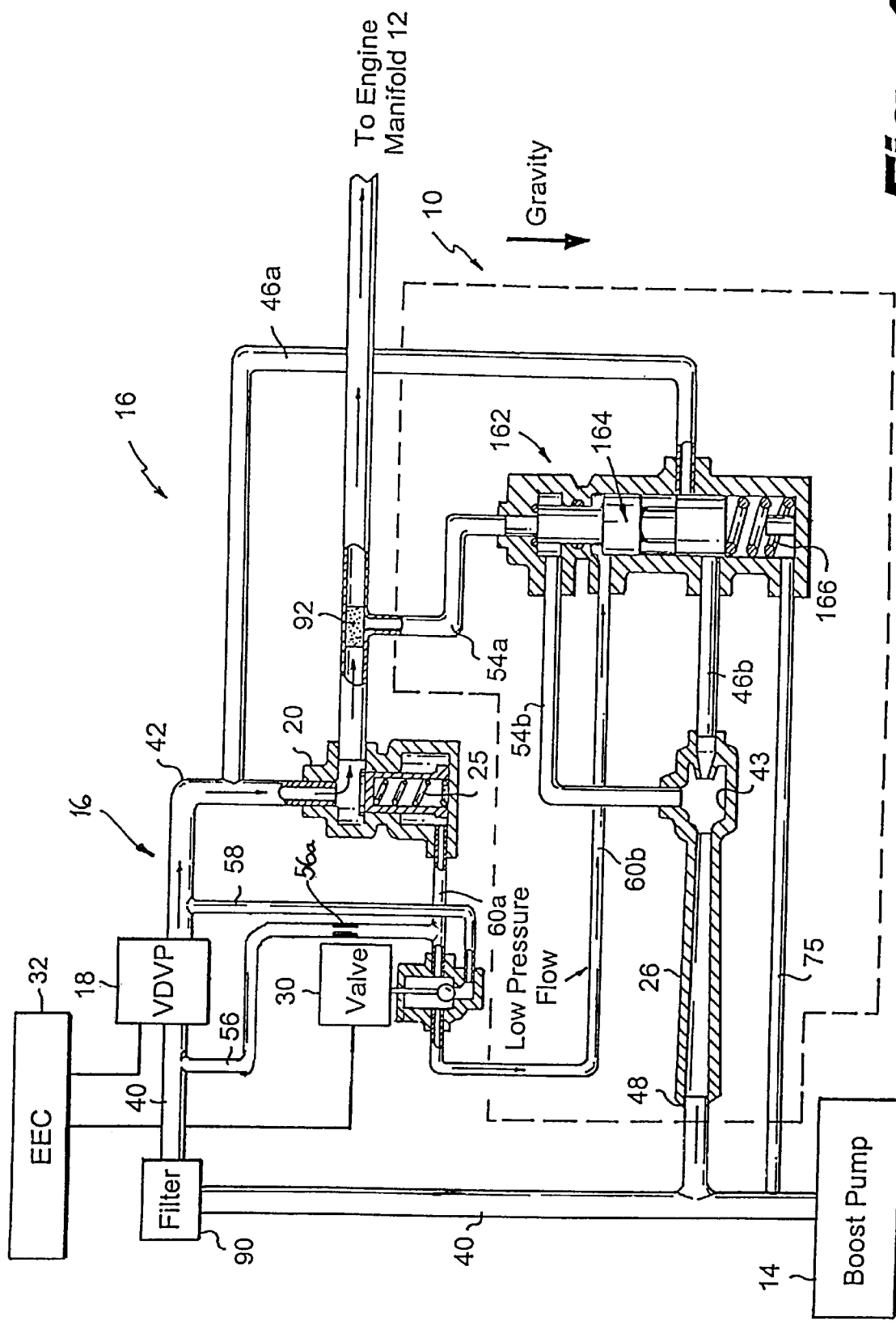
FIG. 4 is an illustration of another embodiment of the manifold drain system of FIG. 1 which does not include structure for preventing air and combustion gases from entering the fuel system once the residual fuel has been drained therefrom.

Referring now to FIG. 4, another preferred embodiment of the manifold drain system of the subject invention is illustrated. In this embodiment of the invention, the integral valve assembly, which is designated generally by reference numeral 162, does not include a float valve, as in the previous embodiment. In this instance, the main fuel pump 18 is in the form of a variable displacement vane pump, such as the pumps disclosed in commonly assigned U.S. Pat. Nos. 5,545,014 and 5,545,018, and the electronic engine control 32 is programmed to command the variable displacement vane pump to its minimum flow position prior to complete engine spool down.

Consequently, the supply of high pressure fuel delivered to the engine manifold 12 from the main fuel pump 18 is depleted before the engine has completely spooled down. As a result, the coiled compression spring 166 in valve assembly 162 forces the valve member 164 to a closed position before air can be drawn into the engine manifold 12, thereby avoiding the need for a float valve. The time at which the variable displacement vane pump is commanded to its minimum flow position is preferably determined by the approximate volume of residual fuel that the engine manifold 12 normally holds, and the rate at which the residual fuel can be drained from the engine manifold.

While the present invention has been described in connection with an aircraft gas turbine engine, it will be appreciated that its application is not limited thereto and that the present invention may be effectively employed on other types of gas turbine engines. Furthermore, while the present invention has been depicted and described with respect to preferred embodiments, it is apparent that modifications and changes can be made thereto without departing from the spirit and scope of the invention as defined by the appended claims.

What is claimed is:

1. A system for draining residual fuel from the engine manifold of a gas turbine, the gas turbine operatively associated with a fuel metering unit having a main fuel pump for delivering high pressure fuel to the engine manifold, a boost pump for delivering low pressure fuel from a fuel tank to the main fuel pump, and a shutoff valve for controlling the flow of high pressure fuel between the engine manifold and the main fuel pump, the system comprising:

a) an ejector having an inlet port for receiving high pressure fuel from the main fuel pump at engine shut-down, an outlet port and a suction port, the ejector defining a nozzle extending between the inlet port and the outlet port for increasing the velocity of high pressure fuel flowing therethrough at engine shut-down so as to create suction at the suction port;

b) a motive valve for controlling the flow of high pressure fuel between the main fuel pump and the inlet port of the ejector, the motive valve configured for movement between a first position wherein high pressure fuel is directed from the main fuel pump to the engine manifold during engine start-up and operation, and a second position wherein high pressure fuel is directed from the main fuel pump to the inlet port of the ejector at engine shut-down;

c) a drain valve for controlling the flow of residual fuel between the engine manifold and the suction port of the ejector, the drain valve configured for movement between a closed position and an open position and an open position as the motive valve moves between said first position and said second position, such that residual fuel is drawn from the engine manifold under suction to the inlet port of the ejector; and d) a solenoid valve in fluid communication with the low pressure side of the main fuel pump by a fuel line and the high pressure side of the main fuel pump by a siphon line for controlling the simultaneous operation of the motive valve and the drain valve.

2. A system as recited in claim 1, further comprising a fuel recycle conduit for delivering residual fuel from the outlet port of the ejector to the fuel tank.

3. A system as recited in claim 1, further comprising means for facilitating fluid communication between the solenoid valve and the motive valve, drain valve and shutoff valve, such that upon engine shut-down the siphon line is opened to direct high pressure fuel from the main fuel pump to the shutoff valve, motive valve and drain valve, whereby the shutoff valve is moved to a closed position, the motive valve is moved to the second position, and the drain valve is moved the open position.

4. A system as recited in claim 1, further comprising means for facilitating fluid communication between the solenoid valve and the motive valve, drain valve and shutoff valve, such that upon engine start-up the siphon line is closed to direct low pressure fuel from the boost pump to the shutoff valve, motive valve and drain valve, whereby the shutoff valve is moved to an open position, the motive valve is moved to the first position, and the drain valve is moved to the closed position.

5. A system as recited in claim 1, further comprising means for activating the solenoid valve upon engine shut-down so as to open the siphon line.

6. A system as recited in claim 1, wherein the motive valve and the drain valve define an integral valve assembly having a common valving member.

7. A system as recited in claim 6, wherein the integral valve assembly includes a float valve mechanism.

8. A fuel control system for a gas turbine engine, comprising:

a) a fuel metering unit having a main fuel pump for delivering high pressure fuel to a manifold of the gas turbine engine, and a boost pump for delivering low pressure fuel from a fuel tank to the main fuel pump;

b) an engine shutoff valve for controlling the flow of high pressure fuel between the engine manifold and the main fuel pump;

c) an ejector having an inlet port for receiving high pressure fuel from the main fuel pump at engine shut-down, an outlet port and a suction port, the ejector defining a nozzle extending between the inlet port and the outlet port for increasing the velocity of high pressure fuel flowing therethrough at engine shut-down so as to create suction at the suction port;

d) a motive valve for controlling the flow of high pressure fuel between the main fuel pump and the inlet port of the ejector, the motive valve configured for movement between a first position wherein high pressure fuel is directed from the main fuel pump to the engine manifold during engine start-up and operation, and a second position wherein high pressure fuel is directed from the main fuel pump to the inlet port of the ejector at engine shut-down;

e) a drain valve for controlling the flow of residual fuel between the engine manifold and the suction port of the ejector, the drain valve configured for movement between a closed position and an open position as the motive valve moves between said first position and said second position, such that residual fuel is drawn from the engine manifold under suction to the inlet port of the ejector; and f) a solenoid valve in fluid communication with the low pressure side of the main fuel pump by a fuel line and the high pressure side of the main pump by a siphon line for controlling the simultaneous operation of the engine shutoff valve, the motive valve and the drain valve.

9. A system as recited in claim 8, further comprising means for facilitating fluid communication between the solenoid valve and the motive valve, drain valve and shutoff valve, such that upon engine shut-down the siphon line is opened to direct high pressure fuel from the main fuel pump to the shutoff valve, motive valve and drain valve, whereby the shutoff valve is moved to a closed position, the motive valve is moved to the second position, and the drain valve is moved the open position.

10. A system as recited in claim 8, further comprising means for facilitating fluid communication between the solenoid valve and the motive valve, drain valve and shutoff valve, such that upon engine start-up the siphon line is closed to direct low pressure fuel from the boost pump to the shutoff valve, motive valve and drain valve, whereby the shutoff valve is moved to an open position, the motive valve is moved to the first position, and the drain valve is moved to the closed position.

11. A system as recited in claim 8, further comprising means for activating the solenoid valve upon engine shut-down so as to open the siphon line.

* * * * *